US009198121B2

(12) United States Patent
Alon

(10) Patent No.: US 9,198,121 B2
(45) Date of Patent: Nov. 24, 2015

(54) SYSTEMS AND METHODS FOR SELECTIVE SCANNING BASED ON RANGE AND MOVEMENT

(71) Applicant: INTEL CORPORATION, Santa Clara, CA (US)

(72) Inventor: Ayelet Alon, Herzliya (IL)

(73) Assignee: INTEL CORPORATION, Santa Clara, CA (US)

( * ) Notice: Subject to any disclaimer, the term of this patent is extended or adjusted under 35 U.S.C. 154(b) by 83 days.

(21) Appl. No.: 13/896,514

(22) Filed: May 17, 2013

(65) Prior Publication Data

US 2014/0341069 A1 Nov. 20, 2014

(51) Int. Cl.

*H04W 4/00* (2009.01)
*H04W 48/16* (2009.01)
*H04W 24/00* (2009.01)
*H04W 52/02* (2009.01)

(52) U.S. Cl.

CPC .............. *H04W 48/16* (2013.01); *H04W 24/00* (2013.01); *H04W 52/0254* (2013.01); *Y02B 60/50* (2013.01)

(58) Field of Classification Search

CPC ..... H04W 48/16; H04W 48/20; H04W 24/00; H04W 52/0245; H04W 52/0251; H04W 52/0254

See application file for complete search history.

(56) References Cited

U.S. PATENT DOCUMENTS 8,155,081 B1 * 4/2012 Mater et al. .................. 370/338
8,165,583 B2 * 4/2012 Parron et al. ............... 455/435.2
8,339,990 B1 * 12/2012 Tzamaloukas ................ 370/254
2004/0137908 A1 * 7/2004 Sinivaara et al. .......... 455/452.1
2006/0187873 A1 * 8/2006 Friday et al. .................. 370/328
2007/0037584 A1 * 2/2007 Um ............................ 455/456.1
2007/0248058 A1 * 10/2007 Fajardo et al. ................ 370/338
2008/0075035 A1 * 3/2008 Eichenberger ................ 370/328
2008/0152034 A1 * 6/2008 Liu et al. ....................... 375/295
2008/0176583 A1 * 7/2008 Brachet et al. ............. 455/456.3
2008/0198811 A1 * 8/2008 Deshpande et al. .......... 370/332
2008/0242305 A1 * 10/2008 Kahlert et al. ................ 455/440
2009/0080381 A1 * 3/2009 Yashar et al. ................. 370/331
2009/0190553 A1 * 7/2009 Masuda et al. ................ 370/331
2010/0111013 A1 * 5/2010 Chou ........................... 370/329
2012/0014303 A1 * 1/2012 Kim et al. ..................... 370/311
2012/0172060 A1 * 7/2012 Qing et al. ................. 455/456.6
2012/0252516 A1 * 10/2012 Miyabayashi et al. ........ 455/515
2014/0086132 A1 * 3/2014 Liu et al. ....................... 370/312

* cited by examiner

*Primary Examiner* — Kevin Mew
(74) *Attorney, Agent, or Firm* — Salehi Law Group

(57) ABSTRACT

A method of scanning for APs includes measuring a variable related to movement of a mobile device, the mobile device executing code to perform the measuring. The method further includes analyzing whether the variable is significant enough to trigger a first scan request, the mobile device executing code to perform the analyzing. The method further includes scanning for APs in response to the first scan request, the mobile device executing code to perform the scanning.

27 Claims, 5 Drawing Sheets

SYSTEMS AND METHODS FOR SELECTIVE SCANNING BASED ON RANGE AND MOVEMENT

TECHNICAL FIELD

Embodiments described herein generally relate to methods of scanning for wireless signals when using a mobile device.

BACKGROUND

Scan operation is a basic function performed by an IEEE 802.11 WiFi device. Scan operations have at least two purposes. The first is to detect available networks to connect to, and the second is, as part of connection maintenance, to detect available candidate Access Points (APs) that may be transitioned to as roaming occurs.

Scan operations have a major impact on platform and device power consumption and their performance. On one hand, the device must remain active while searching, in order to be able to transmit probe requests or receive probe responses and beacons. Thus, it cannot enter idle or sleep states during scan operation, resulting in high power consumption. On the other hand, if the device is already active and busy, scan operation interferes with those tasks. Operations, such as reception of data frames from the associated access point (AP), are delayed, whenever the device allocates a slot for scanning.

Existing implementations initiate scan operation in predefined intervals, either fixed or incremented over time.

DETAILED DESCRIPTION OF THE DRAWINGS

Figure 1:
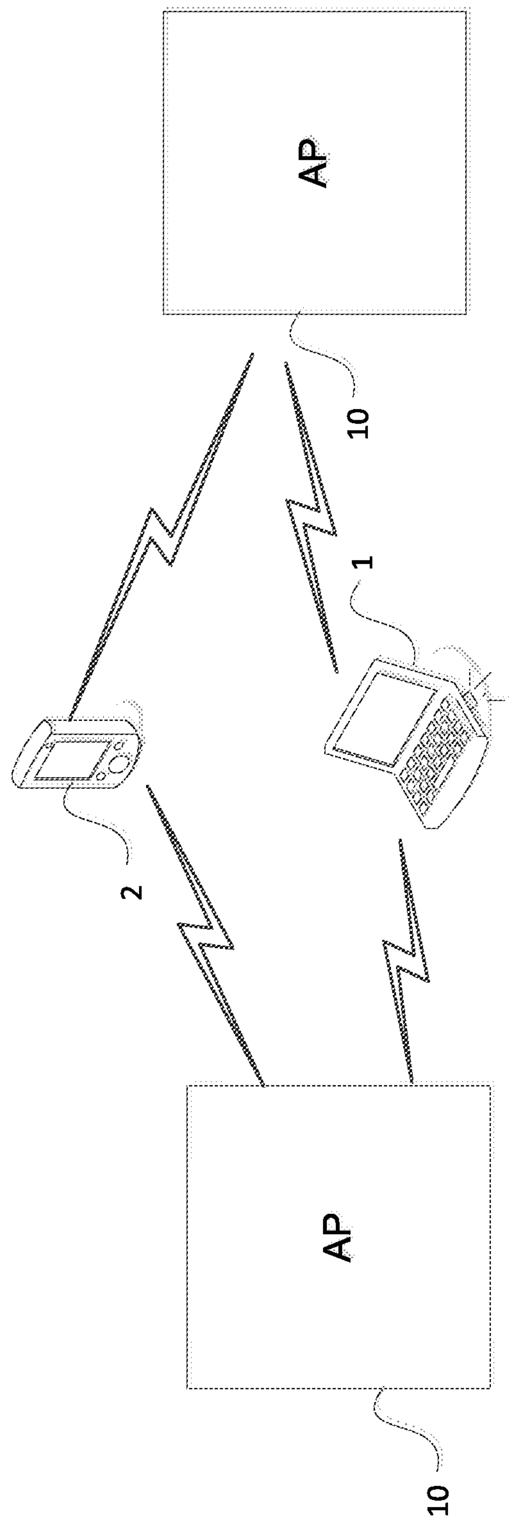
FIG. 1 shows a diagram of a possible environment for the use of systems and methods for Selective Scanning Based on Range and Movement.

Described herein are embodiments of systems and methods for Selective Scanning Based on Range and Movement. Instead of a device performing active scanning operations at frequent intervals, the scanning operation is modified to depend on other available inputs such as the strength of signals received and the detected movement of the device. Typically these APs are WiFi APs but other types of signals and networks may be scanned and monitored. In some configurations, the systems herein may operate in accordance with IEEE 802.11, but the operations are not limited to this protocol and may operate with current and further transmission protocols, other than IEEE 802.11.

In many embodiments, scan policy may be configured to be power efficient and have minimal impact on traffic, while maintaining the ability to detect all available networks or peers in its vicinity. The requirement to keep track of the environment while maintaining low power consumption may be important in many embodiments when used with mobile devices.

Mobile devices, by definition, are frequently on the move and therefore in order to track the changing environment, the frequency of the scan operation has been increased in existing systems. However, by simply increasing the scan frequency to detect changes in the environment, the power consumption was also increased respectively. This resulted in a decrease in battery life for mobile devices.

The result of attempting to track changes in the environment is that for mobile devices, the intervals are becoming shorter resulting in high power consumption regardless of how the device is actually used.

Embodiments of systems and methods for Selective Scanning Based on Range and Movement analyze the environment that the device is in order to minimize scan operation when no change in scan result is expected or when the probability of those results to trigger change in the current connection is low. As a result, less scan operations are executed, less power is consumed, and interference to other tasks is minimized. At the same time, sufficient to provide a similar level of detection of APs is provided.

In one embodiment, a method to define scan policy includes a protocol that scans according to roaming probability and detection probability, based on the distance from the associated AP and detection of movement. Movement may be measured by one of the following methods: detection of change in received signal strength of frames transmitted from the associated AP or other APs in vicinity or sensor base indication (acceleration or tilt), and location based information (GPS) when available.

Distance from the associated AP may be measured by one of the following methods: measurement of received signal strength of frames transmitted from the AP or location or base information (GPS) when available. Alternatively, the inertial sensors of a mobile device may be used to detect and estimate movement using dead reckoning techniques to estimate position.

In many configurations, a combination of some or all of these techniques may be utilized in conjunction with each other to determine an optimized method for scanning. For example, scanning policy may be set based on RSSI and GPS together.

FIG. 1 shows a diagram of a possible environment for the use of systems and methods for Selective Scanning Based on Range and Movement. Various devices such as laptop or tablet computers 1 or smart phone 2 may be in range of one or more access points 10. As the devices move around the environment, the signal they receive from access points 10 may change, due to distance, interference, or other transmission issues. The systems and methods for Selective Scanning Based on Range and Movement may be implemented in the software, hardware, firmware, or any combination thereof in the devices. Based on the signals received from access points 10, the devices 1, 2 are able to calculate the strength of the signals. Using the strengths of the signals (RSSI) and/or other indicators, it can be determined whether the devices 1, 2 are moving or at a minimum that the signal reception is changing. Based on this, the scan policy may be modified. The access points may be a variety of transmitters, such a WiFi transmitters, but may include a wide variety of other transmission systems, such as 3G, 4G, CDMA, and other types of signals that may be received by tablets, laptops, and smart phones.

Figure 2:
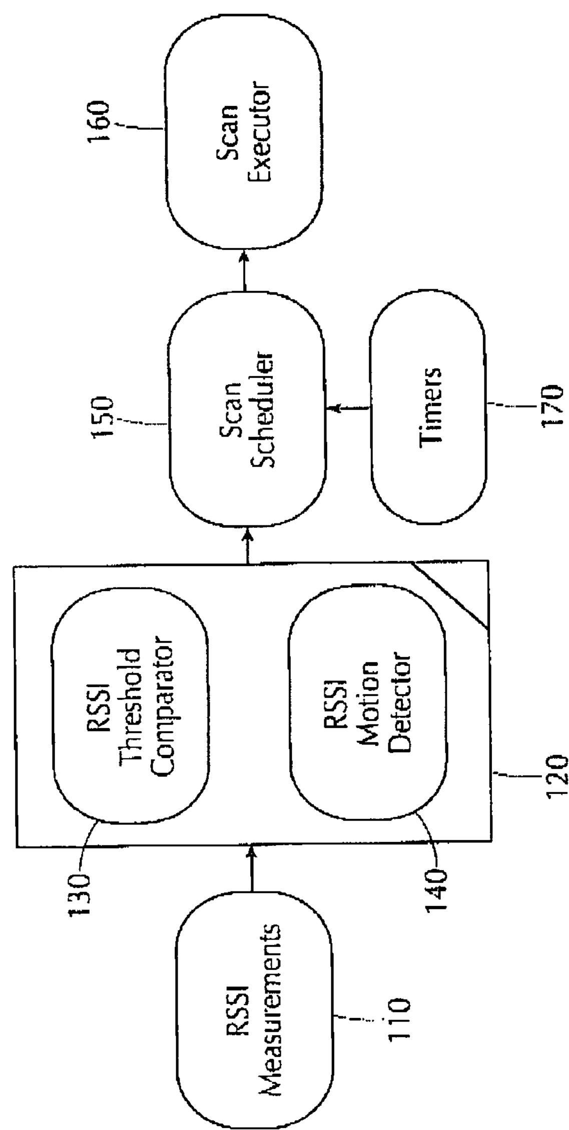
FIG. 2 shows one embodiment of a system for Selective Scanning Based on Range and Movement.

FIG. 2 shows one embodiment of a system for Selective Scanning Based on Range and Movement. The system shown implements a method for scanning based on received signal strength indications (RSSI). The system blocks shown may be implemented in hardware, software, or a combination of those. The system blocks interact with the mechanisms of a mobile device, in many cases a smart phone or similar device. For the sake of convenience, they will be referred to as modules herein.

Module 110 receives and calculates RSSI measurements. In many cases and examples these RSSI measurements may be in relation to one or more APs. The APs are typically WiFi APs, but the systems and methods described herein may find use with a variety of APs. This module 110 may communicate with the antenna, RF receiver and other systems of a mobile device. RSSI measurement block may measure the signal strength of received frames from the associated APs. A smooth function or averaging may be used with the measured RSSI to minimize RSSI variance due to multi-path or temporal disturbances. The RSSI measurements are communicated to the analysis module 120. The analysis block 120 determines whether a variable is sufficient to trigger scans. In this case the variable is the RSSI measurement.

In the embodiment shown, the analysis module 120 includes two sub-modules, a RSSI threshold comparator module 130 and a RSSI motion detector module 140. Various configurations are possible for these modules. In some configuration, the RSSI threshold comparator module 130 may trigger scans when a signal from an AP becomes weaker. The RSSI threshold comparator module 130 may also suppress scans when the RSSI measurements become stronger or are strong enough that the device may prefer to maintain current connection. The RSSI threshold comparator module 130 may communicate that a scan should be done immediately or after a selected time period has passed. The RSSI threshold comparator module 130 may also indicate to the scan scheduler whether to relax or tighten the scan interval, as a function of the measured RSSI. RSSI threshold comparator module shall compare the measured RSSI with a pre-defined threshold or thresholds (−80 dBm for example), and shall indicate scans to the Scan Scheduler module when the threshold or thresholds are crossed.

The RSSI motion detector module 140 functions in a similar way. The RSSI motion detector module 140 may compare previously detected RSSI measurements with previously detected RSSI measurements to determine if sufficient change has occurred to justify a scan. As above, this scan may be immediate or after a set period of time has elapsed. Furthermore, the period of time in this case and above may be timed from either when the scan request is sent or when the last scan occurred. RSSI motion detector block may track RSSI changes. It may compare the last RSSI that triggered scan request with current RSSI, and may indicate Scan Scheduler block once RSSI delta is bigger than threshold (5 dB for example).

Scan scheduler module 150 receives scan requests from the analysis module 120 and schedules scans accordingly. Timers 170 provide time information so that the scan scheduler may calculate when the scans are to occur. Scan executor 160 scans for access points, by performing the applicable scan procedure. Scan procedure for WiFi device may include transmission of probe requests and/or reception of probe responses and beacons.

Figure 3:
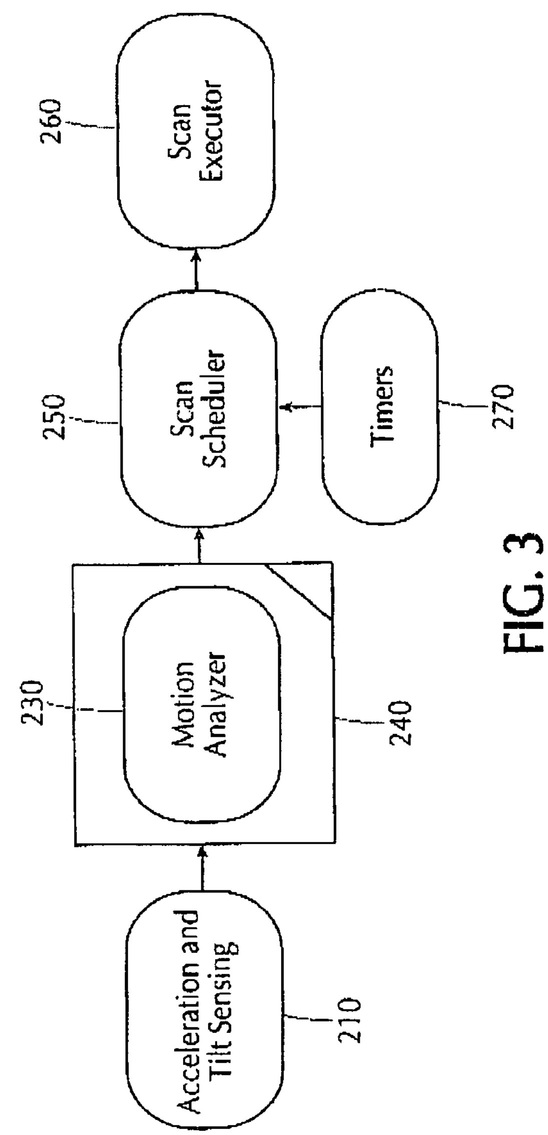
FIG. 3 shows another embodiment of a system for Selective Scanning Based on Movement.

FIG. 3 shows another embodiment a system for Selective Scanning Based on Movement. This embodiment may function independently, in conjunction with, or may be combined with the previous embodiments. Acceleration and tilt sensing module 210 receives movement information from the mobile device's sensors and detects movement. This module may optionally receive signals from an accelerometer, a gyroscope, a magnetometer, and a pressure sensor. Dead reckoning techniques may be optionally used to determine the degree of movement. Motion analyzer module 230 is deployed in analysis module 240. Optionally, other modules may be deployed in analysis module 240, such as a GPS (Global Positioning System) position analyzer module may be deployed as well. A GPS position analyzer module may calculate and analyze movement based on received GPS signals. The motion analyzer module 230 determines whether the degree of motion is sufficient to trigger a scan. This analysis may be based on acceleration over a period of time, tilt, dead reckoning techniques, or a variety of other movement criteria that will be apparent to those of ordinary skill in the art in light of this disclosure.

Similar to as described above, scan requests are passed to the scan scheduler 250 which causes the scan executor 260 to execute scans according to the times indicated by the analysis module 240. The timers module 270 provides time indications to the scan schedule 250 so that scans can be executed according to the timing indicated. Essentially, the motion analysis module 240 analyses the motion information received and indicates to the scan scheduler whether to relax or tighten the scan interval. In the examples of FIGS. 2 and 2, the module structure provided is merely exemplary and modules may in some implementations be combined and modified to accomplish the same basis tasks detecting a change in position and scheduling scans accordingly.

Figure 4:
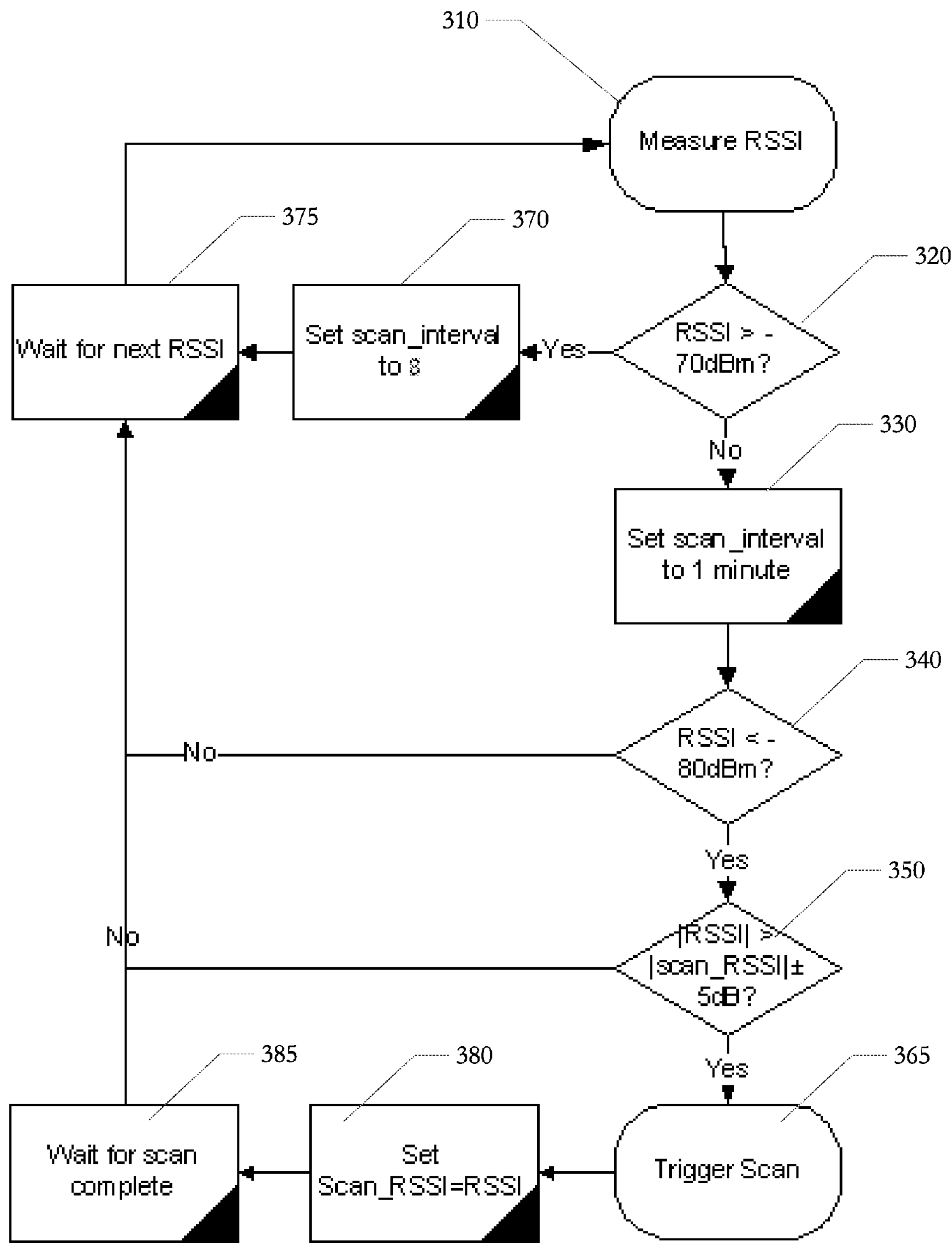
FIG. 4 shows one embodiment of a method for Selective Scanning Based on Range and Movement.

FIG. 4 shows one embodiment of a method for adjusting scan schedule according to RSSI measurements. This method may be implemented in the system of FIG. 2 or a different system. In step 310, the RSSI are measured over received beacons. In step 320 it is determined whether the RSSI measured is greater than a close range threshold (in this case −70 dBm) such that the mobile device will be close enough to an AP to justify not scanning. If that is the case, then the scan interval is set to infinity (or alternatively to refrain from scanning) in step 370 until the next beacon is received in step 375, where after the process loops. If the RSSI measured is not greater than the close range threshold then the scan interval is set to one minute in step 330. One minute is merely an example of a scan time (and is a typical default scan time) and alternatives may be used In step 340, if the RSSI measured is not less than the far range threshold (in this case—80 dBm) then the scan period of one minute is maintained until the next beacon. If it is less that the far range threshold, then this indicates that the mobile device may be too distant from the AP and additional scanning is needed. The system may then determine whether the RSSI measured is changing in step 350. If it is changing sufficiently then a scan may be justified, if not a scan may not be justified. In step 350, the measured RSSI is compared to the previously measured and recorded RSSI signal (scan_RSSI). If the absolute value of the measured RSSI is greater than the absolute value of scan_RSSI plus or minus 5 dBm, then a scan is triggered in step 365 and the current RSSI is stored in the Scan_RSSI in step 380. Then a scan is completed in step 385. If not, then the method passes to step 375. Essentially, scan operation is a function of distance from the AP or change in RSSI The selective scanning method described may be integrated into Scan operation to improve power consumption and performance during normal operation. At steady state, when a WiFi device is close to the AP and does not move, scan operation shall not occur. When device moved farther away from the AP, scan will be completed at least every minute. If additional movement is occurring, scans will take place as the device moves farther and farther away from the AP or as it moves closer to the AP. When the device is close enough to the AP again, the system stops scanning until new movement is detected.

This is purely an exemplary method for using RSSI and many alternative analysis techniques may be utilized. These will typically rely on the distance from an AP as measured by the RSSI and the change from previous RSSI measurements to schedule scans.

Figure 5:
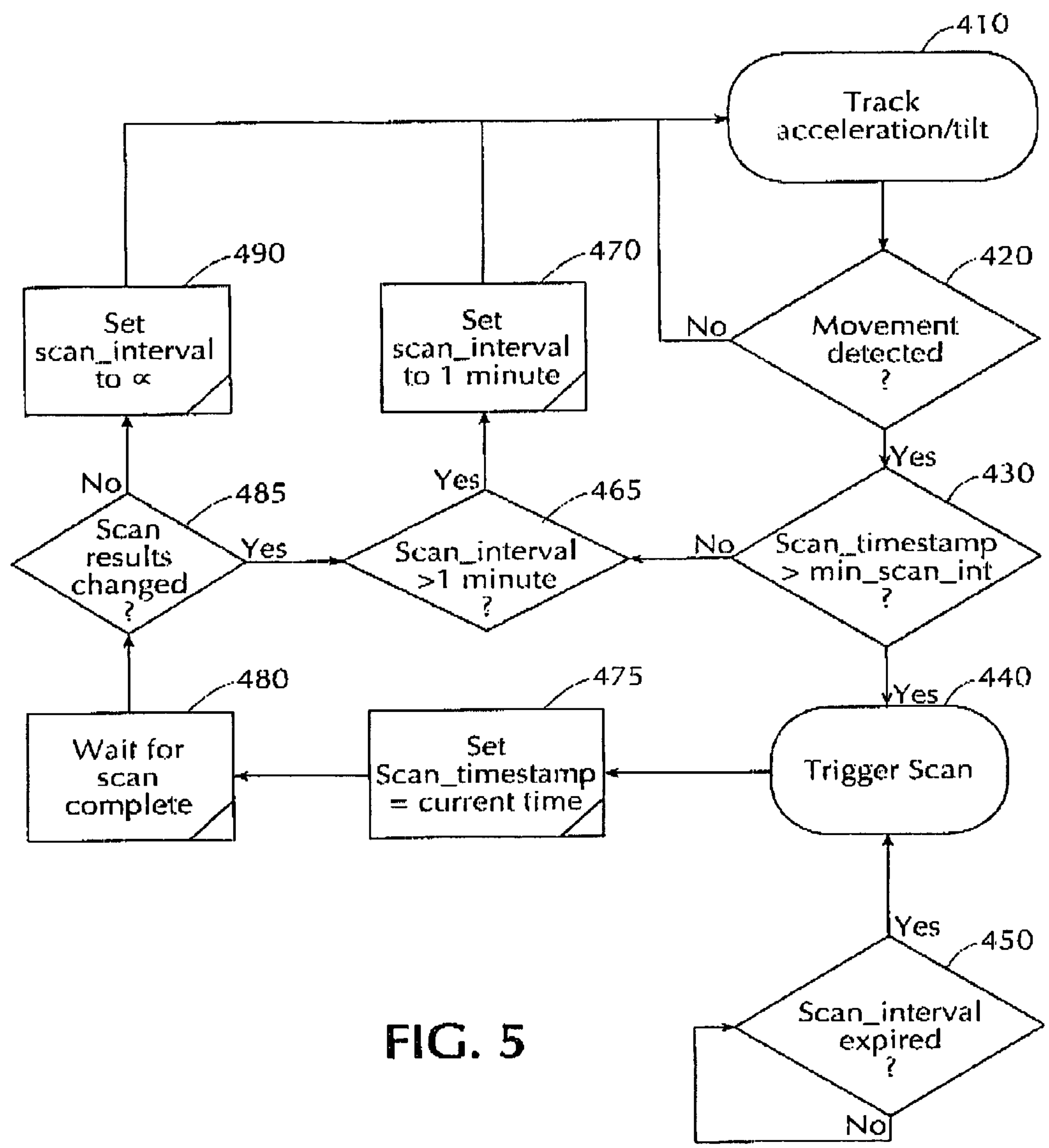
FIG. 5 shows another embodiment of a method for Selective Scanning Based on Movement.

FIG. 5 shows an embodiment of an acceleration/tilt sensing related method for Selective Scanning Based on Movement. In step 410 acceleration and tilt are tracked until movement is detected in step 420. In step 430, it is determined whether the time of the last scan is more than a minimum scan interval (in this case 30 seconds for example). If it is more than the minimum scan interval then a scan is triggered in step 440. After a scan is triggered in step 440 the scan timestamp is set to the current time is step 475. In step 480 the system waits for the scan to be completed. In step 485 it is determined if the scan results have changed. If the scan results have then scan interval checked in step 465 to determine if scan interval is greater than a minute (which in this case would be infinity). If it is, then the scan interval is set to one minute in step 470. One minute is merely an example of a scan time (and is a typical default scan time) and alternatives may be used. If the scan time is already a minute, the system returns to tracking movement in step 410.

If in step 485 the scan results have not changed then the interval is set to infinity (or to refrain from scanning) in step 490 and the system returns to tracking movement in step 410.

If in step 430, it is determined that the time of the last scan is not more than a minimum scan interval (in this case 30 seconds for example), then the scan interval is checked in step 465 to determine if scan interval is greater than a minute. If it is, then the scan interval is set to one minute in step 470. If the scan time is already a minute, the system returns to tracking movement in step 410. Step 450 functions simultaneously with the primary flow of the method, constantly checking to see if the scan interval has expired. If it has, then it activates the scan sequence. Essentially, when movement is detected a scan will be completed at least every minute until the scan results cease to change. If additional movement is occurring, scans will take place up to as fast as the minimum scan interval, in this case 30 seconds. When the scan results cease to change (step 485), the system stops scanning until new movement is detected. The minimum scan interval is the minimum interval allowed between scan operations and helps to avoid excessive scanning. The maximum scan interval is the maximum interval allowed for scanning when movement or changes in the environment are detected.

Various embodiments of s systems and methods for a Selective Scanning Based on Range and Movement may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

In one embodiment, a method of scanning for APs and Peers includes measuring a variable related to range of a mobile device from the associated AP, the mobile device executing code to perform the measuring. The method further includes analyzing whether the variable is significant enough to trigger a first scan request, the mobile device executing code to perform the analyzing. Optionally, the variable is received signal strength indications (RSSI), optionally from received beacons. In one alternative, the analyzing includes when the RSSI is greater than a close range threshold, the interval to next scan is set to refrain from scanning and the mobile device waits for the next RSSI measurement. Optionally, the analyzing includes when the RSSI is less than a close range threshold, a scan interval is set to a first time, and the mobile device waits for the next RSSI measurement.

Optionally, a method of scanning for APs and Peers includes measuring a variable related to movement of a mobile device, the mobile device executing code to perform the measuring. The method further includes analyzing whether the variable is significant enough to trigger a first scan request, the mobile device executing code to perform the analyzing. In one embodiment, the variable is received signal strength indications (RSSI). Optionally, when a change in the RSSI minus a previous RSSI is greater than a first threshold, signifying movement is detected, the mobile device performs the analyzing of whether the variable is significant enough to trigger a first scan request. In one configuration, the analyzing includes when the RSSI is less than a far range threshold. In another embodiment, the variable is acceleration and tilt of the mobile device. Optionally, when a change in the acceleration and tilt signifying movement is detected, the mobile device performs the analyzing of whether the variable is significant enough to trigger a first scan request. In one configuration, the analyzing includes determining if a minimum scan interval has passed and triggering the first scan request when the minimum scan interval has passed.

In one embodiment, a system for scanning for APs and Peers includes a computing system including a plurality of modules. The computing system includes a RSSI measurement module configured to calculate received signal strength indications (RSSI) based on the signal strength of received frames for each of a plurality of APs. The system further includes an analysis module including a RSSI threshold comparator, the RSSI threshold comparator configured to receive the measured RSSI and compare the measured RSSI to a first threshold and when the calculated RSSI has crossed the first threshold create a first scan request. The system further includes a scan scheduler module configured to receive the first scan request and schedule generation of first scan indications. The system further includes a scan executor module configured to perform a first scan of APs responsive to a first scan indication from the scan scheduler based on the first scan request.

Optionally, the analysis module further includes an RSSI motion detector, the RSSI motion detector configured to compare a last RSSI to the measured RSSI and calculate a delta RSSI and responsive to the delta RSSI being greater than a second threshold create a second scan request, the scan scheduler module configured to receive the second scan request and generate a second scan indication, and the scan executor module configured to perform a second scan of APs responsive to the second scan indication from the scan scheduler based on the second scan request. In one alternative, the computing system further includes a timer, the timer providing a time signal to the scan scheduler. Optionally, the first and second scan indications are generated in response to both the timer and the analysis module. In another alternative, after receiving the first scan request the scan scheduler module waits a first period of time before sending the first scan indication, the first period of time provided by the timer. Optionally, the measured RSSI is manipulated by the first module to minimize RSSI variance due to multi-path or temporal disturbances. Optionally, a smoothing function is used to minimize RSSI variance due to multi-path or temporal disturbances.

In another embodiment, a system for scanning for APs and Peers includes a mobile device. The mobile device includes a computing system including code adapted to measure a variable related to movement of the mobile device. The code is further adapted to analyze whether the variable is significant enough to trigger a first scan request. The code is further adapted to determine when to pass on the first scan request to a scan executor and scan for APs in response to the first scan request. In one alternative, the movement is calculated based on received signal strength indications (RSSI). In one configuration, the RSSI are compared to a first threshold to determine whether to trigger the first scan request, the first threshold being a close range threshold to determine whether the mobile device is close enough to an AP to not require a scan. Optionally, the RSSI are compared to a second threshold, the second threshold being a far range threshold for determining whether the mobile device is too far from the AP to provide for adequate reception. In one alternative, the RSSI are compared to a last RSSI measurement and a delta RSSI is calculated, the delta RSSI compared to a third threshold to determine whether to trigger the first scan request based on whether the change in reception is significant. In another alternative, the movement is calculated based on input from inertial sensors. Optionally, the inertial sensors include sensors selected from the group consisting of an accelerometer, a gyroscope, a magnetometer, and a pressure sensor. Optionally, when the movement is above a first threshold a scan is triggered. Alternatively, when the movement is above a first threshold and the elapsed time since the last scan was triggered is greater than a minimum time, a scan is triggered.

In one embodiment, a computer-readable non-transitory storage medium that contains instructions, which when executed by one or more processors result in performing operations includes measuring a variable related to range and movement of a mobile device, the mobile device executing code to perform the measuring. The operations further include analyzing whether the variable is significant enough to trigger a first scan request, the mobile device executing code to perform the analyzing. The operations further include scanning for APs in response to the first scan request, the mobile device executing code to perform the scanning. Optionally, the variable is received signal strength indications (RSSI). Alternatively, the analyzing includes that when the RSSI is greater than a first range threshold, a scan interval is set to refrain from scanning and the mobile device waits for further received signal strength measurements. In one configuration, the analyzing includes when the RSSI is not greater than a first range threshold, a scan interval is set to a first time and the scanning occurs according to the scan interval. In another configuration, the analyzing includes when the RSSI is less than a second range threshold and a change in the RSSI minus a previous RSSI is greater than a first threshold and in response the first scan request is triggered. Optionally, the variable is acceleration and tilt of the mobile device. Alternatively, when a change in the acceleration and tilt signifying movement is detected, the mobile device performs the analyzing of whether the variable is significant enough to trigger a first scan request. Optionally, the analyzing includes comparing a last RSSI to the RSSI and calculating a delta RSSI and responsive to the delta RSSI being greater than a second threshold creating a second scan request; and the scanning includes generating a second scan indication responsive to the second scan request, and performing a second scan of APs responsive to the second scan indication.

The previous detailed description is of a small number of embodiments for implementing the systems and methods for a Selective Scanning Based on Range and Movement and is not intended to be limiting in scope. The following claims set forth a number of the embodiments of the systems and methods for a Selective Scanning Based on Range and Movement disclosed with greater particularity.

What is claimed:

1. A method of scanning for access points (APs), the method comprising:

measuring a variable related to range and movement of a mobile device, the mobile device executing code to perform the measuring, the variable including received signal strength indications (RSSI);

analyzing whether the variable is significant enough to trigger a first scan request, the mobile device executing code to perform the analyzing;

scanning for APs in response to the first scan request, the mobile device executing code to perform the scanning;

wherein analyzing further includes that when the RSSI is greater than a first range threshold, a scan interval is set to refrain from scanning and the mobile device waits for further received signal strength measurements.

2. The method of claim 1, wherein the analyzing includes when the RSSI is not greater than a first range threshold, a scan interval is set to a first time and the scanning occurs according to the scan interval.

3. The method of claim 2, wherein the analyzing includes when the RSSI is less than a second range threshold and a change in the RSSI minus a previous RSSI is greater than a first threshold and in response the first scan request is triggered.

4. The method of claim 1 wherein the variable is acceleration and tilt of the mobile device.

5. The method of claim 4 wherein when a change in the acceleration and tilt signifying movement is detected, the mobile device performs the analyzing of whether the variable is significant enough to trigger a first scan request.

6. The method of claim 2, wherein the analyzing includes comparing a last RSSI to the RSSI and calculating a delta RSSI and responsive to the delta RSSI being greater than a second threshold creating a second scan request; and the scanning includes generating a second scan indication responsive to the second scan request, and performing a second scan of APs responsive to the second scan indication.

7. A system for scanning for APs, the system comprising:

a computing system including a plurality of modules, including:

a RSSI measurement module configured to calculate calculated received signal strength indications (RSSI) based on the signal strength of received frames for each of a plurality of APs;

an analysis module including a RSSI threshold comparator, the RSSI threshold comparator configured to receive the calculated RSSI and compare the calculated RSSI and compare the calculated RSSI to a first threshold and when the calculated RSSI has crossed the first threshold create a first scan request;

a scan scheduler module configured to receive the first scan request and generate a first scan indication;

a scan executor module configured to perform a first scan of APs responsive to a first scan indication from the scan scheduler based on the first scan request.

8. The system of claim 7, wherein the analysis module further includes an RSSI motion detector, the RSSI motion detector configured to compare a last RSSI to the calculated RSSI and calculate a delta RSSI and responsive to the delta RSSI being greater than a second threshold create a second scan request, the scan scheduler module configured to receive the second scan request and generate a second scan indication, and the scan executor module configured to perform a second scan of APs responsive to the second scan indication from the scan scheduler based on the second scan request.

9. The system of claim 8, where the computing system further includes a timer, the timer providing a time signal to the scan scheduler.

10. The system of claim 9, wherein the first and second scan indications are generated in response to both the timer and the analysis module.

11. The system of claim 10, wherein after receiving the first scan request the scan scheduler module waits a first period of time before sending the first scan indication, the first period of time provided by the timer.

12. The system of claim 7, wherein the calculated RSSI is manipulated by the first module to minimize RSSI variance due to multi-path or temporal disturbances.

13. The system of claim 12, wherein a smoothing function is used to minimize RSSI variance due to multi-path or temporal disturbances.

14. A system for scanning for APs, the system comprising:

a mobile device including:

a computing system including code adapted to measure a variable related to movement of the mobile device, the movement calculated based on received signal strength indications (RSSI);

analyze whether the variable is significant enough to trigger a first scan request;

determine when to pass on the first scan request to an AP scanner; and scan for APs in response to the first scan request;

wherein the RSSI are compared to a first threshold to determine whether to trigger the first scan request, the first threshold being a first range threshold to determine whether the mobile device is close enough to an AP to not require a scan.

15. The system of claim 14 wherein the RSSI are compared to a second threshold, the second threshold being a second range threshold for determining whether the mobile device is too far from the AP to provide for adequate reception.

16. The system of claim 15 wherein movement is calculated based on RSSI.

17. The system of claim 16 wherein the RSSI are compared to a last RSSI measurement and a delta RSSI is calculated, the delta RSSI compared to a second threshold to determine whether to trigger the first scan request based on whether the change in reception is significant.

18. The system of claim 14 wherein the movement is calculated based on input from inertial sensors.

19. The system of claim 18 wherein the inertial sensors include sensors selected from the group consisting of an accelerometer, a gyroscope, a magnetometer, and a pressure sensor.

20. The system of claim 19, wherein when the movement is above a first threshold a scan is triggered.

21. The system of claim 20, wherein when the movement is above a first threshold and the elapsed time since the last scan was triggered is greater than a minimum time, a scan is triggered.

22. A computer-readable non-transitory storage medium that contains instructions, which when executed by one or more processors result in performing operations comprising:

measuring a variable related to range and movement of a mobile device, the mobile device executing code to perform the measuring, the variable is received signal strength indications (RSSI);

analyzing whether the variable is significant enough to trigger a first scan request, the mobile device executing code to perform the analyzing;

scanning for APs in response to the first scan request, the mobile device executing code to perform the scanning;

wherein the analyzing includes that when the RSSI is greater than a first range threshold, a scan interval is set to refrain from scanning and the mobile device waits for further received signal strength measurements.

23. The medium of claim 22, wherein the analyzing includes when the RSSI is not greater than a first range threshold, a scan interval is set to a first time and the scanning occurs according to the scan interval.

24. The medium of claim 23, wherein the analyzing includes when the RSSI is less than a second range threshold and a change in the RSSI minus a previous RSSI is greater than a first threshold and in response the first scan request is triggered.

25. The medium of claim 22, wherein the variable is acceleration and tilt of the mobile device.

26. The medium of claim 25, wherein when a change in the acceleration and tilt signifying movement is detected, the mobile device performs the analyzing of whether the variable is significant enough to trigger a first scan request.

27. The medium of claim 23, wherein the analyzing includes comparing a last RSSI to the RSSI and calculating a delta RSSI and responsive to the delta RSSI being greater than a second threshold creating a second scan request; and the scanning includes generating a second scan indication responsive to the second scan request, and performing a second scan of APs responsive to the second scan indication.

* * * * *